Jan. 19, 1971    W. J. SCHRENK ET AL    3,556,635

FIBER OPTIC BUNDLE

Filed May 23, 1967

INVENTORS.
Walter J. Schrenk
BY Douglas S. Chisholm

AGENT

United States Patent Office 3,556,635
Patented Jan. 19, 1971

3,556,635
FIBER OPTIC BUNDLE
Walter J. Schrenk, Bay City, and Douglas S. Chisholm, Midland, Mich., assignors to The Dow Chemical Company, Midland, Mich., a corporation of Delaware
Filed May 23, 1967, Ser. No. 640,656
Int. Cl. G02b 5/16
U.S. Cl. 350—96          7 Claims

ABSTRACT OF THE DISCLOSURE

A thermoplastic fiber optic bundle is provided by simultaneous extrusion of matrix, jacket and light conducting fibers to provide fiber optic bundles of varying degrees of stiffness, flexibility and resolution.

---

This invention relates to a fiber optic bundle and to a method for the preparation thereof, and more particularly relates to a fiber optic bundle composed of diverse synthetic resinous compositions and a method for the preparation of such bundles.

Fiber optic bundles have a variety of applications and in many instances are desirable to transmit information from one location to another. The use of fiber optic bundles for many applications is limited due to the relatively high cost of preparing such bundles from a plurality of fibers wherein oftentimes such bundles are prepared by coating individual fibers with a light absorbing coating, a coating of lower refractive index, oftentimes adding an additional abrasion resistant coating, aligning the fibers into a bundle and bonding the fibers to provide a bundle which assures that proper relative arrangement of the fibers will be maintained through its useful life. Much care and labor is required to prepare bundles of high resolving power, that is, bundles having a large number of filaments or fibers therein. Bundles of lower resolving power and subsequently a lower number of fibers are more readily prepared by using larger fibers, aligning and bonding together.

It would be desirable if there were available an improved fiber optic bundle of synthetic resinous thermoplastic material.

It would also be desirable if there were available a method for the preparation of such bundles.

It would be beneficial if there were available a fiber optic bundle which would permit the light carrying fibers to occupy as large a portion of the cross-sectional bundle as conveniently possible.

It would also be desirable if there were available a method for the preparation of fiber optic bundles which was rigid and relatively inexpensive.

It would be beneficial if there were available a method for the preparation of fiber optic bundles which did not require layup and coating of individual filaments as separate operations.

These benefits and other advantages in accordance with the present invention are achieved in a fiber optic bundle, the fiber optic bundle having a first end and a second end, the fiber optic bundle comprising a plurality of generally parallel optically transparent synthetic resinous filaments extending from the first end to the second end, a synthetic resinous matrix of a continuous nature, the transparent filaments being in contact with material having a refractive index difference of at least 2 percent.

Also contemplated within the scope of the present invention is a method for the preparation of such fiber optic bundles. The method of the present invention comprises providing at least a first stream of a heat plastified synthetic resinous material which is optically transparent, a second stream of a second synthetic resinous material, the first and second synthetic resinous materials differing in refractive index by at least 2 percent, dividing the first heat plastified stream of synthetic resinous material into a plurality of generally parallel substreams, encapsulating the substreams within the second heat plastified stream to form a third heat plastified stream, subsequently cooling the third stream below the thermoplastic temperature thereof.

Further features and advantages of the present invention will become more apparent from the following specification when taken in connection with the drawing wherein:

FIG. 1 schematically represents the preparation of a fiber optic bundle in accordance with the invention.

Figure 1:
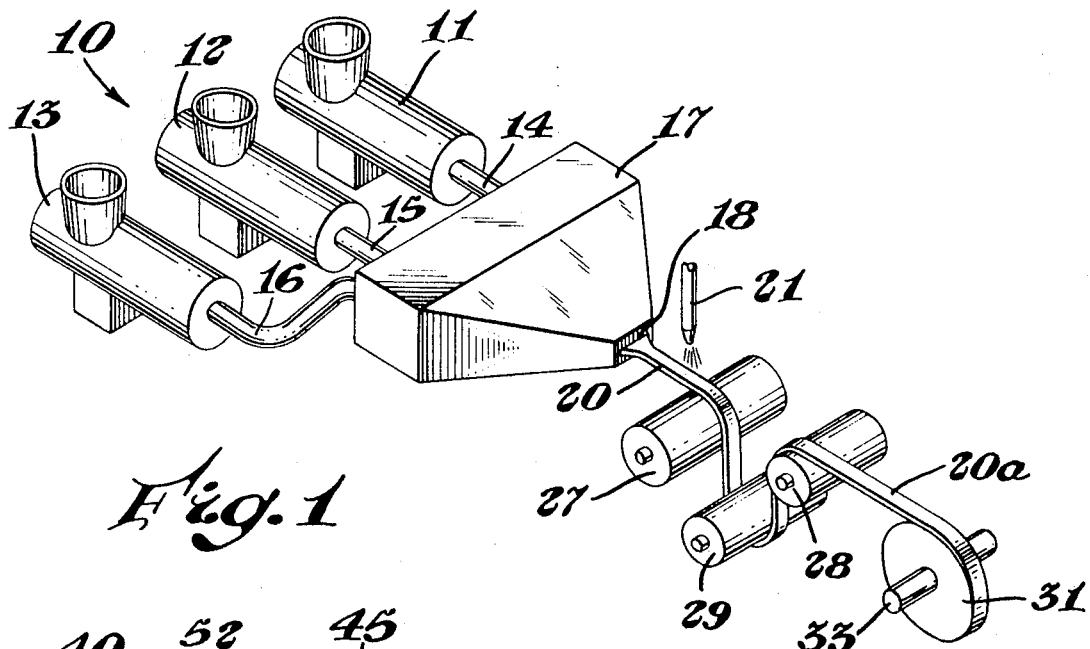

In FIG. 1 there is depicted an apparatus for the preparation of fiber optic bundles generally designated by the reference numeral 10. The apparatus 10 comprises in cooperative combination first, second and third sources of heat plastified synthetic resinous material for extruders 11, 12 and 13, respectively. The extruders 11, 12 and 13 discharge heat plastified synthetic resinous thermoplastic materials into conduits 14, 15 and 16, respectively. A die 17 is in operative combination with the conduits 14, 15 and 16 and receives first, second and third heat plastified streams therefrom. The die 17 defines an extrusion orifice 18 from which issues a composite stream 20. A cooling means 21 is disposed generally adjacent the composite stream 20 and adapted to reduce the temperature of the composite stream 20 to an orienting temperature. Passing over the rolls 27, 28 and 29 the composite stream is oriented and cooled to form a continuous multiphase fiber optic bundle 20a. The bundle 20a is rolled onto a takeup roll 31 supported on the shaft 33.

Figure 2:
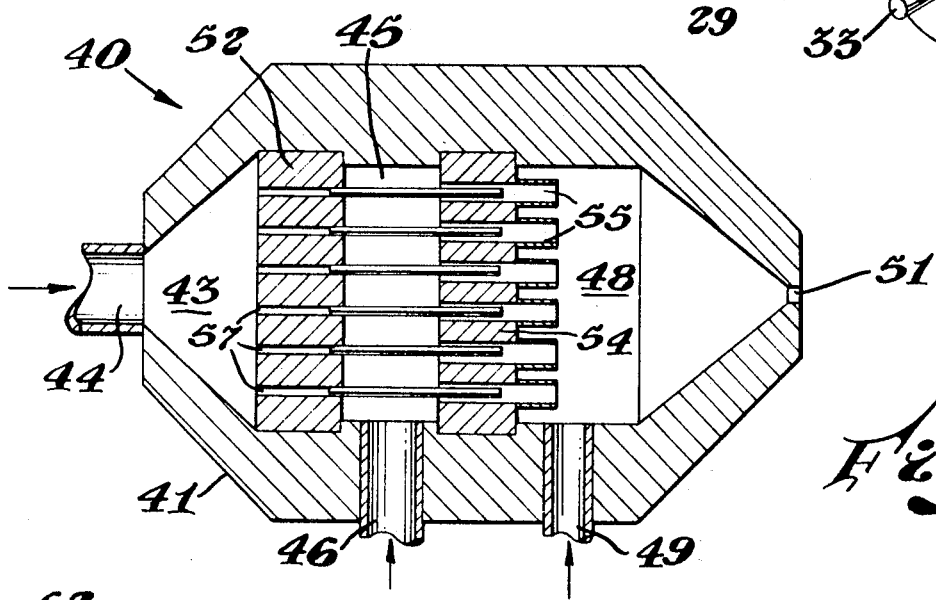
FIG. 2 is a schematic representation of a sectional view of a die suitable for the preparation of fiber optic bundles in accordance with the present invention.

In FIG. 2 there is depicted schematically a sectional view of a die such as the die 17 suitable for the preparation of optic fiber bundles in accordance with the present invention. The die is generally designated by the reference numeral 40. The die 40 comprises a die body 41 defining a first inlet plenum 43 in operative communication with a first polymer source or conduit 44. The die body 41 defines a second or intermediate polymer plenum 45 in operative communication with a second polymer or conduit 46. A third or discharge plenum 48 is defined by the die body 41 and is in operative communication with a third polymer source 49. Remote from the first plenum 43, the third plenum 48 terminates in a discharge passage 51 defined by the die body 40. A first dividing means 52 is disposed between the first plenum 43 and the second plenum 45. A second dividing means 54 is disposed between the second plenum 45 and the third plenum 48. The second dividing means 54 has defined therein a plurality of passages 55. The passages 55 provide communication between the second plenum 45 and the third plenum 48. The first dividing means 52 defines a plurality of passages 57 which provide communication between the plenum 43 and a location within the second dividing means 54.

In operation of the die as depicted in FIG. 2, a first heat plastified synthetic resinous material is supplied through the supply means 44 to the plenum 43. From the plenum 43 the synthetic resinous material flows through the passageways 57 and is discharged within the passages 55. Beneficially, the heat plastified synthetic resinous thermoplastic material supplied to the plenum 43 is a material which is transparent and forms the light carrying component of the desired fiber optic bundle. The passageway 49 receives a heat plastified thermoplastic material from which the matrix is formed. The heat plastified material entering the plenum 48 encapsulates the light fiber forming material from the passageways 57 which is discharged from the passageways 55. By maintaining the total extrusion rate such that turbulence does not occur in the plenum 48, a composite stream made up of a matrix of material entering the passageway 49 and a plurality of elongated filaments entering the passage 44 flows toward the extrusion orifice 51 and is extruded as an elongate multi-component filament or bundle containing a plurality of filaments of light carrying ability. Beneficially, a third heat plastified thermoplastic component is added. The component to the passageway 46 has light absorbent properties and beneficially they serve as an adhesive between the light carrying filaments and the resinous matrix.

Figure 3:
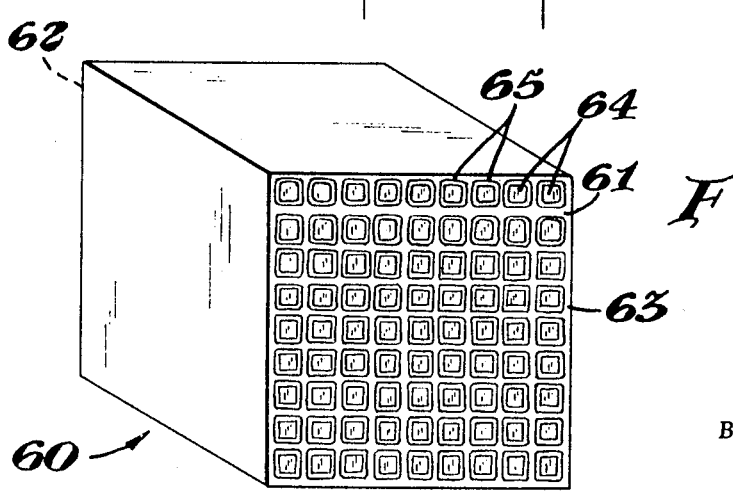
FIG. 3 is a schematic representation of a fiber optic bundle in accordance with the invention.

In FIG. 3 there is schematically depicted a portion of a synthetic resinous thermoplastic fiber optic bundle generally designated by the reference numeral 60. The bundle 60 has a first optically finished end 61 and a second optically finished end 62. The bundle 60 comprises a generally continuous synthetic resinous matrix 63 having disposed therein a plurality of optically transparent filaments 64 extending from the first end to the second end. A synthetic resinous layer 65 surrounds each of the filaments 64 and is disposed between the filaments 64 and the matrix 63.

A wide variety of synthetic resinous materials may be employed in the practice of the present invention and include materials set forth in the following table together with their refractive index.

TABLE 1

| Polymer type: | Refractive index |
| --- | --- |
| Polytetrafluoroethylene | 1.35 |
| FEP (fluorinated ethylenepropylene copolymer) | 1.34 |
| Polyvinylidenefluoride | 1.42 |
| Polychlorotrifluoroethylene | 1.42 |
| Polybutyl acrylate | 1.46 |
| Polyvinyl acetate | 1.47 |
| Ethyl cellulose | 1.47 |
| Polyformaldehyde | 1.48 |
| Polyisobutyl methacrylate | 1.48 |
| Polybutyl methacrylate | 1.48 |
| Polymethyl acrylate | 1.48 |
| Polypropyl methacrylate | 1.48 |
| Polyethyl methacrylate | 1.48 |
| Polymethyl methacrylate | 1.49 |
| Cellulose acetate | 1.49 |
| Cellulose propionate | 1.49 |
| Cellulose acetate-butyrate | 1.49 |
| Cellulose nitrate | 1.49 |
| Polyvinyl butyral | 1.49 |
| Polypropylene | 1.49 |
| Low density polyethylene (branched) | 1.51 |
| Polyisobutylene | 1.51 |
| Natural rubber | 1.52 |
| Perbunan | 1.52 |
| Polybutadiene | 1.52 |
| Nylon (condensation copolymer of hexamethylene-diamine and adipic acid) | 1.53 |
| Polyvinyl chloroacetate | 1.54 |
| Polyvinyl chloride | 1.54 |
| Polyethylene (high density linear) | 1.54 |
| A copolymer of 67 parts by weight methyl methacrylate and 33 parts by weight styrene | 1.54 |
| A copolymer of 85 parts by weight vinyl chloride and 15 parts by weight vinylidene chloride | 1.55 |
| Poly-α-methylstyrene | 1.56 |
| A copolymer of 60 parts by weight styrene and 40 parts by weight butadiene | 1.56 |
| Neoprene | 1.56 |
| A copolymer of 70 parts by weight styrene and 30 parts by weight acrylonitrile | 1.57 |
| Polycarbonate resin | 1.59 |
| Polystyrene | 1.60 |
| A copolymer of 85 parts by weight vinylidene chloride and 15 parts by weight vinyl chloride | 1.61 |
| Polydichlorostyrene | 1.62 |

Generally, it is particularly beneficial to employ for the light transmitting elements such as the elements 64 a synthetic resinous material having high transparency such as polymethyl methacrylate, polystyrene and the like. Beneficially, the matrix such as the matrix 63 employs a flexible synthetic resinous material such as polyethylene where flexibility in the product is desired. Alternately, rigid materials such as polystyrene or the like may be employed if a rigid fiber bundle is desired. Oftentimes, in order to achieve maximum definition of the image transmitted through such a light bundle, it is desirable to incorporate a light absorbing layer similar to that disclosed in U.S. Pat. 3,253,500. Such a light absorbing layer is provided by adding a pigment such as carbon black to the material forming the matrix 63. Suitable partially light absorbing material may be used for the layer 65, and is obtained by addition of an appropriate quantity of pigment or light absorbing material to a transparent or translucent thermoplastic resinous composition.

Beneficially in the practice of the present invention, it is desirable that the light filaments have a diameter of from about 5 microns to about 250 microns, and for maximum resolution, a diameter of about 50 to 250 microns. Usually, it is preferred that the synthetic resinous thermoplastic material surrounding the light conducting filament have a refractive index difference of at least about two percent, and beneficially being lower in refractive index than the light conducting fiber. Greater light transmission is usually obtained if the refractive index difference is maintained as large as possible. Oftentimes during the formation of light conducting bundles in accordance with the present invention it is desirable to molecularly orient at least one component of the bundle in order to provide a product having maximum tensile strength. Such orientation is well known in the plastics processing art and need not be further discussed. The extruded product is readily severed and the ends thereof polished or provided with a matte finish depending upon the particular and use desired. Polishing is readily accomplished employing conventional methods for glass or plastics and can be done by abrasive means or heat.

Light conducting fiber optic bundles in accordance with the present invention are, if desired, particularly flexible in that they may be prepared employing widely different quantities of light conducting material depending on the relative feed rates of the synthetic resinous thermoplastic materials to an extrusion die such as the die of FIG. 2. For example, in the preparation of a light conducting bundle in accordance with the present invention employing two components, the feed rate to the plenum 43 is readily adjusted in such a manner that it is twenty to thirty times as great as the feed rate of thermoplastic material to the passageway 49. The encapsulating material supplied from the conduit 49 is insufficient to fill voids between circular synthetic resinous substreams flowing from the passages 55. Therefore, the streams flowing from the passageways 55 tend to deform and become non-circular in cross-sectional configuration. Assuming the density of the first and second synthetic resinous material are about equal, the total light conducting proportion of the resultant fiber bundle can be as much as 95 percent or even greater. Where maximum flexibility is desired, a soft synthetic resinous material is employed as the matrix 63 and at a proportionately higher feed rate to obtain a product having light conducting elements spaced to a somewhat greater extent by means of a flexible matrix.

By way of further illustration, a fiber optic bundle is prepared employing the method and apparatus generally as set forth in FIGS. 1 and 2 and hereinbefore described, by simultaneously or co-extruding polystyrene filaments encapsulated in polymethyl methacrylate which in turn are encapsulated within a matrix of polyethylene containing 8 weight percent carbon black. Referring to FIG. 2, polystyrene is supplied to the conduit 44, the polyethylene carbon black mixture to the conduit 49 and the polymethyl methacrylate to the conduit 46. The resultant extruded bundle has a diameter of about ⅜ inch and 100 individual fibers of polystyrene having a cross-sectional diameter of about 200 microns. Each of the polystyrene fibers are encapsulated within a jacket of polymethyl methacrylate having a thickness of about 25 microns. The polyethylene matrix comprises about 30 percent by volume of the bundle. The resultant strand is flexible and coherent. Cutting and polishing the ends of the strands provide a flexible light transmitting device.

When the foregoing illustration is repeated with the exception that polymethyl methacrylate is supplied to the passageway 44, ethyl cellulose supplied to the passageway 46 and polypropylene containing 10 weight percent carbon black supplied to the passageway 49, an eminently satisfactory fiber optic device is obtained which is stiffer than the strand of the previous example.

Employing a die generally similar to that set forth in FIG. 2 but adapted to extrude 49 encapsulated fibers in a rectangular configuration, a copolymer of 65 weight percent methyl methacrylate and 35 weight percent styrene is employed to form the light transmitting fibers which have a diameter of about 100 microns. Each of the fibers is jacketed with a layer of polymethyl methacrylate approximately 10 microns in thickness. The fibers are encapsulated within a matrix of chlorinated polyethylene containing about 35 weight percent chlorine and about 7 weight percent carbon black. The matrix is approximately 45 percent by volume of the bundle. The bundle is square in cross-section and each side is approximately 0.034 inch in length. The strands from the extruder on cooling are cut into 100 lengths of approximately four feet each and arranged in a square configuration 10 strands by 10 strands. The strands are clamped in a 10 x 10 arrangement and supported with the clamped end upward. The square cross-section of the strands permits the fibers at the end remote from the clamped end to be readily positioned in a like relative arrangement to that at the clamped end by drawing the bundle through a square opening having about 0.345 inch per side. The second end of the bundle is then clamped. Each end of the bundle is cut and polished to provide an exceptionally flexible fiber optic bundle.

In a manner similar to the foregoing illustrations, fiber optic bundles of almost any desired length, degree of resolution and flexibility are readily prepared.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forh and defined in the hereto-appended claims.

What is claimed is:
1. A synthetic resinous thermoplastic elongate fiber optic bundle, the fiber optic bundle having
  a first end and
  a second end, the bundle consisting essentially of
  a plurality of generally parallel optically transparent synthetic thermoplastic resinous filaments extending from the first end to the second end,
  a synthetic resinous matrix of a continuous nature surrounding said filaments, the transparent filaments being substantially individually encapsulated within,
  a thermoplastic extrudable material having a refractive index difference of at least two percent from the refractive index of the resinous material forming the transparent filaments,
  the fiber optic bundle being thermoplastic and prepared by simultaneous extrusion.
2. The bundle of claim 1 wherein the bundle has a generally rectangular configuration.
3. The bundle of claim 1 wherein the optically transparent filaments are polymethyl methacrylate.
4. The bundle of claim 1 wherein the matrix is relatively flexible when compared to the material of the synthetic resinous filaments.
5. The bundle of claim 1 wherein the matrix is optically opaque.
6. The bundle of claim 1 in combination with a plurality of generally like bundles having first ends and second ends disposed in adjacent relationship and in generally like order.
7. The bundle of claim 6 wherein the end portions of adjacent bundles are in fixed relationship to each other.

References Cited
UNITED STATES PATENTS

| | | | |
|---|---|---|---|
| 2,687,673 | 8/1954 | Boone | 264—2X |
| 3,444,031 | 5/1969 | Schrenk | 161—3.5 |
| 2,825,260 | 3/1958 | O'Brien | 350—96 |
| 3,016,785 | 1/1962 | Kapany | 350—96 |
| 3,141,105 | 7/1964 | Courtney-Pratt | 350—96 |
| 3,265,892 | 8/1966 | Sheldon | 350—96 |
| 3,303,374 | 2/1967 | Fyler | 350—96 |

OTHER REFERENCES

Nature, Jan. 2, 1954, pp. 39–41.

Mason, J. P., and J. F. Manning: The Technology of Plastics and Resins, Van Nostrand Co., Inc., 1945, pp. 250–251.

Hackh's Chemical Dictionary, McGraw-Hill Book Co., 1944, p. 500.

ROBERT F. BURNETT, Primary Examiner

W. A. POWELL, Assistant Examiner

U.S. Cl. X.R.

161—5, 6, 168, 175, 402; 264—171